US010647867B2

(12) United States Patent
Sugihara et al.

(10) Patent No.: US 10,647,867 B2
(45) Date of Patent: May 12, 2020

(54) INK SET FOR INK-JET RECORDING

(71) Applicants: TOYO INK SC HOLDINGS CO., LTD., Tokyo (JP); TOYO INK CO., LTD., Tokyo (JP)

(72) Inventors: Masahiro Sugihara, Tokyo (JP); Yoshihito Suzuki, Tokyo (JP); Kazuhiro Jonai, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 295 days.

(21) Appl. No.: 15/551,912

(22) PCT Filed: Feb. 18, 2016

(86) PCT No.: PCT/JP2016/054755
§ 371 (c)(1),
(2) Date: Aug. 18, 2017

(87) PCT Pub. No.: WO2016/133171
PCT Pub. Date: Aug. 25, 2016

(65) Prior Publication Data
US 2018/0187033 A1    Jul. 5, 2018

(30) Foreign Application Priority Data

Feb. 20, 2015 (JP) ................... 2015-031193

(51) Int. Cl.
| C09D 11/40 | (2014.01) |
| C09D 11/322 | (2014.01) |
| C09D 11/326 | (2014.01) |
| B41M 5/00 | (2006.01) |
| C09D 11/104 | (2014.01) |
| C09D 11/102 | (2014.01) |
| C09D 11/107 | (2014.01) |

(52) U.S. Cl.
CPC ........... *C09D 11/40* (2013.01); *B41M 5/0011* (2013.01); *C09D 11/102* (2013.01); *C09D 11/104* (2013.01); *C09D 11/107* (2013.01); *C09D 11/322* (2013.01); *C09D 11/326* (2013.01); *B41M 5/0017* (2013.01)

(58) Field of Classification Search
None
See application file for complete search history.

(56) References Cited

U.S. PATENT DOCUMENTS 6,994,745 B2 *   2/2006   Hoshida ................ C08F 220/28
                                                        106/31.25
10,208,217 B2 *   2/2019   Takahashi ............ C09D 11/326
2003/0097960 A1   5/2003   Ito et al.
2005/0075449 A1   4/2005   Kubota
2006/0189712 A1 *   8/2006   Kondo ................. C09D 11/101
                                                        523/160
2006/0275606 A1  12/2006   Mizutani
2007/0060670 A1 *   3/2007   Ellis ..................... C09D 11/322
                                                        523/160
2007/0188535 A1 *   8/2007   Elwakil ................ B41M 5/0023
                                                        347/15
2008/0182083 A1   7/2008   Oyanagi et al.
2008/0182085 A1   7/2008   Oyanagi et al.
2010/0302300 A1 *  12/2010   Verdonck ............... B41J 2/2114
                                                        347/17
2012/0038725 A1   2/2012   Ohya et al.
2013/0135382 A1 *   5/2013   Mitsuzawa ........... C09D 11/40
                                                        347/20
2014/0066550 A1 *   3/2014   Shigemori ........... C09D 11/326
                                                        524/90
2016/0102220 A1 *   4/2016   Kido ..................... C09D 11/40
                                                        428/195.1
2018/0237646 A1 *   8/2018   Yoda ......................... B41J 2/01

FOREIGN PATENT DOCUMENTS

| JP | 2006-307198 | 11/2006 |
| JP | 2008-247941 | 10/2008 |
| JP | 2010-215852 | 9/2010 |
| JP | 4595281 | 12/2010 |
| JP | 2011-006657 | 1/2011 |

(Continued)

OTHER PUBLICATIONS

"International Search Report (Form PCT/ISA/210)", dated May 24, 2016, with English translation thereof, pp. 1-4.

(Continued)

*Primary Examiner* — Helene Klemanski
(74) *Attorney, Agent, or Firm* — JCIPRNET

(57) ABSTRACT

The present invention relates to an ink set for inkjet recording containing a white ink and color inks including a cyan ink, a magenta ink and a yellow ink, wherein each ink independently contains a pigment, a pigment dispersing resin, an organic solvent and water, the pigment dispersing resin A of either the white ink or the color inks has an alkyl chain with a carbon number of 10 or greater, the pigment dispersing resin B of the other of the white ink or the color inks has a polyoxyalkylene chain, and the pigment dispersing resin A and the pigment dispersing resin B are different resins. According to the present invention, an ink set for inkjet recording can be provided that exhibits excellent printability during high-speed printing, even when printing onto less permeable substrates, and is capable of producing sharp image quality with little mixed color bleeding.

15 Claims, No Drawings

(56) References Cited

FOREIGN PATENT DOCUMENTS

| JP | 2011-038008 | 2/2011 |
| JP | 4764562 | 9/2011 |
| JP | 2013-082885 | 5/2013 |
| JP | 2013-256665 | 12/2013 |
| JP | 2014-025008 | 2/2014 |

OTHER PUBLICATIONS

"Office Action of Japan Counterpart Application", with English translation thereof, dated Dec. 8, 2015, p. 1-p. 5, in which the listed references were cited.
"Search Report of Europe Counterpart Application", dated Aug. 6, 2018, p. 1-p. 7.
"Office Action of China Counterpart Application," with English translation thereof, dated Dec. 31, 2019, pp. 1-16.

* cited by examiner

INK SET FOR INK-JET RECORDING

CROSS-REFERENCE TO RELATED APPLICATION

This application is a 371 application of the international PCT application serial no. PCT/JP2016/054755, filed on Feb. 18, 2016, which claims the priority benefit of Japan application no. 2015-031193, filed on Feb. 20, 2015. The entirety of each of the above—mentioned patent applications is hereby incorporated by reference herein and made a part of this specification.

TECHNICAL FIELD

The present invention relates to an ink set for inkjet recording and an inkjet printing method.

BACKGROUND ART

The inkjet recording method is a recording method in which ink liquid droplets are discharged from extremely fine nozzles and adhered directly to a recording member to obtain text or an image. This method not only has the advantages that the apparatus used generates little noise and is easy to operate, but also offers the advantages that creating colors is easy, and plain paper can be used as the recording member. Accordingly, these types of apparatus are widely used as output devices in offices and households.

On the other hand, even in industrial applications, improvements in inkjet technology mean the use of inkjet devices as output devices for digital printing is now expected, and printing devices using solvent-based inks and UV inks that are capable of printing even to low-absorption print media (including plastic substrates such as PVC and PET) are actually commercially available. However, in recent years, because of the need to satisfy environmental requirements, the demand for aqueous inks is increasing.

As described in Patent Documents 1, 2 and 3, inks for printing to plain paper and specialty papers such as photographic glossy paper have long been available as aqueous inks suitable for inkjet printing. However, in recent years, expectations have grown for an expansion in the potential applications for inkjet recording systems, and there are growing needs for direct printing to coated papers and low-absorption printing substrates such as those used in industrial applications. With conventional inks, liquid droplets are absorbed into the paper to create an image, and therefore if printing is performed onto a printing substrate having low water absorption, the image tends to blur, meaning such conventional inks cannot be used.

In industrial applications, printing to transparent substrates such as PET films and printing to colored substrates are becoming increasingly necessary. If only process color inks are printed to these substrates, then the color effect of the substrate means that an image having inferior coloration and visibility is sometimes obtained. In order to address this issue, methods that also use white inks are known. In other words, by subjecting the substrate to an undercoating treatment by printing a white ink prior to printing the color inks, and subsequently forming an image with the color inks on top of this undercoat, an image that exhibits excellent color development of the color inks and superior visibility can be obtained. Further, in a similar manner, by subjecting the substrate to an undercoating treatment by printing a color ink prior to printing the white ink, and subsequently forming an image with the white ink on top of this undercoat, an image that exhibits excellent color development of the white ink and superior visibility can be obtained. Accordingly, developments aimed at practical applications of white aqueous inkjet inks continue to be pursued (Patent Documents 4 and 5).

However, if a white ink such as those disclosed in the aforementioned documents is printed onto a low-absorption substrate such as a PET film to undercoat the substrate, and a color ink is then printed on top of that undercoat, a problem arises in that mixed color bleeding occurs between the white ink and the color ink, making it difficult to obtain a sharp image. Further, in a similar manner, if a color ink is printed first to undercoat the substrate, and a white ink is then printed on top of that undercoat, mixed color bleeding occurs, and superior image quality cannot be obtained.

PRIOR ART DOCUMENTS

Patent Documents

Patent Document 1: JP 4764562 B
Patent Document 2: JP 4595281 B
Patent Document 3: JP 2008-247941 A
Patent Document 4: JP 2006-307198 A
Patent Document 5: JP 2014-025008 A

DISCLOSURE OF INVENTION

Problems Invention Aims to Solve

An object of the present invention is to provide an ink set for inkjet recording that exhibits excellent printability during high-speed printing, even when printing onto less permeable substrates, and is capable of producing sharp image quality with little mixed color bleeding.

Means for Solution of the Problems

In other words, one aspect of the present invention relates to an ink set for inkjet recording comprising a white ink and color inks including a cyan ink, a magenta ink and a yellow ink, wherein each ink independently comprises a pigment, a pigment dispersing resin, an organic solvent and water, the pigment dispersing resin of either the white ink or the color inks is a pigment dispersing resin A having an alkyl chain with a carbon number of 10 or greater, the pigment dispersing resin of the other of the white ink or the color inks is a pigment dispersing resin B having a polyoxyalkylene chain, and the pigment dispersing resin A and the pigment dispersing resin B are different resins.

Further, one aspect of the present invention relates to an ink set for inkjet recording comprising a white ink and color inks including a cyan ink, a magenta ink and a yellow ink, wherein each ink independently comprises a pigment, a pigment dispersing resin, an organic solvent and water, the pigment dispersing resin of each color ink is, independently, a pigment dispersing resin A having an alkyl chain with a carbon number of 10 or greater, the pigment dispersing resin of the white ink is a pigment dispersing resin B having a polyoxyalkylene chain, and the pigment dispersing resin A and the pigment dispersing resin B are different resins.

Further, another aspect of the present invention relates to an ink set for inkjet recording comprising a white ink and color inks including a cyan ink, a magenta ink and a yellow ink, wherein each ink independently comprises a pigment, a pigment dispersing resin, an organic solvent and water, the pigment dispersing resin of each color ink is, independently, a pigment dispersing resin B having a polyoxyalkylene chain, the pigment dispersing resin of the white ink is a pigment dispersing resin A having an alkyl chain with a carbon number of 10 or greater, and the pigment dispersing resin A and the pigment dispersing resin B are different resins.

Furthermore, yet another aspect of the present invention relates to an aforementioned ink set for inkjet recording, comprising an organic solvent having a boiling point of at least 180° C. but not more than 280° C. and a surface tension of at least 20 mN/m but not more than 30 mN/m as the organic solvent.

Further, yet another aspect of the present invention relates to an aforementioned ink set for inkjet recording, wherein the acid value of the pigment dispersing resin A is higher than the acid value of the pigment dispersing resin B.

Furthermore, yet another aspect of the present invention relates to an aforementioned ink set for inkjet recording, wherein at least one of the pigment dispersing resin A and the pigment dispersing resin B independently has an aromatic ring structure.

Moreover, yet another aspect of the present invention relates to an inkjet printing method that uses an aforementioned ink set for inkjet recording, the method comprising:

a step of subjecting a printing substrate to an undercoating treatment by printing one of either a color ink or the white ink onto the printing substrate, while heating the printing substrate at 40 to 80° C., and a step of printing the other of the color ink or the white ink onto the printing substrate that has undergone the undercoating treatment, while heating the printing substrate at 40 to 80° C.

Effects of the Invention

By using the ink set for inkjet recording of the present invention, an ink set for inkjet recording can be provided that exhibits excellent printability during high-speed printing, even when printing onto less permeable substrates, and is capable of producing sharp image quality with little mixed color bleeding.

EMBODIMENTS FOR CARRYING OUT THE INVENTION

The present invention is described below using a series of preferred embodiments.

In these embodiments, in an ink set for inkjet recording comprising a white ink and color inks, a pigment dispersing resin having an alkyl chain with a carbon number of 10 or greater (the pigment dispersing resin A) is used in one of either the color inks or the white ink, and a pigment dispersing resin having a polyoxyalkylene chain (the pigment dispersing resin B) is used in the other of the color inks or the white ink. As a result, the printability during high-speed printing is excellent, even when printing onto less permeable substrates, and sharp image quality with little mixed color bleeding can be achieved.

Aqueous inks generally exhibit poor permeability into less permeable substrates such as PET films, and often undergo no permeation at all. As a result, the ink is retained on the substrate in an undried state, which causes fusion of the ink droplets that leads to image deterioration such as mixed color bleeding. Accordingly, when an aqueous ink is printed to this type of less permeable substrate, a method is generally used in which a drying mechanism such as a heater is provided below and/or above the printing portion that contacts the substrate, or dry air is blown onto the printing portion, meaning the ink is dried during printing. Further, even in those cases where an undercoating treatment is performed by printing one of either a color ink or the white ink onto the less permeable substrate, and the other of the color ink or the white ink is then printed on top of the undercoat, the above type of drying method is used to dry the ink on the substrate while printing is performed in almost all cases.

However, even if a less permeable substrate such as a PET film is printed while drying is performed using the type of drying method described above, if the printing speed is raised to achieve high-speed printing, then drying of the ink tends to become inadequate, meaning the ink used for the undercoating treatment and the ink printed on top of the undercoat tend to undergo mixed color bleeding, resulting in a deterioration in the image quality.

As a result of intensive investigation aimed at suppressing mixed color bleeding between the ink used for the undercoating treatment and the ink printed on top of the undercoat, the inventors of the present invention discovered that in an ink set for inkjet recording containing color inks and a white ink, by using a pigment dispersing resin having an alkyl chain with a carbon number of 10 or greater in one of either the color inks or the white ink, and using a pigment dispersing resin having a polyoxyalkylene chain in the other ink, excellent printability and a sharp image quality with little mixed color bleeding could be achieved even when performing high-speed printing to a less permeable substrate, and they were thus able to complete the present invention.

The reasons that mixed color bleeding between the color inks and the white ink can be suppressed, enabling sharp image quality to be obtained, are not entirely clear, but are thought to include the following. When the pigment dispersing resin used in the color inks and the pigment dispersing resin used in the white ink exhibit good compatibility, the pigment dispersing resins are more likely to mix, resulting in mixed color bleeding between the color inks and the white ink, when the inks on the substrate are in an incompletely dried state. On the other hand, if the pigment dispersing resin used in the color inks and the pigment dispersing resin used in the white ink are not readily compatible, then it is thought that even if the inks on the substrate are in an incompletely dried state, mixed color bleeding can be more easily suppressed. In embodiments of the present invention, different pigment dispersing resins are used in the color inks and the white ink. Specifically, using a pigment dispersing resin having an alkyl chain with a carbon number of 10 or greater in one of either the color inks or the white ink, and using a pigment dispersing resin having a polyoxyalkylene chain in the other ink is a feature of the present invention. In this manner, it is thought that by suppressing the compatibility between the pigment dispersing resins by using dispersing resins having different properties such as polarity, mixed color bleeding between the different inks can be suppressed even when the inks are in an incompletely dried state during high-speed printing. It should be noted that the mechanism described above is merely a theory, and in no way limits the scope of the present invention.

Each of the main components of the present embodiment are described below.

<Pigment Dispersing Resin A>

The pigment dispersing resin A used in the present embodiment has an alkyl chain with a carbon number of 10 or greater within the structure.

The alkyl chain with a carbon number of 10 or greater may be either linear or branched, but is preferably linear. Specific examples of the alkyl chain include a decyl group (C10), lauryl group (C12), myristyl group (C14), cetyl group (C16), stearyl group (C18), arachyl group (C20), behenyl group (C22), lignoceryl group (C24), cerotoyl group (C26), montanyl group (C28), myricyl group (C30), dotriacontanoyl group (C32), tetratriacontanoyl group (C34) and hexatriacontanoyl group (C36), but this is not an exhaustive list. Provided the alkyl chain has a carbon number of 10 or greater, mixed color bleeding can be suppressed, and excellent image quality can be obtained, but if the chain becomes too long, then the discharge stability may deteriorate in some cases. From the viewpoints of image quality and discharge stability, the carbon number of the alkyl chain is preferably within a range from 10 to 30, and more preferably from 18 to 24.

In the present embodiment, among all of the monomer units that constitute the pigment dispersing resin A, the proportion of the monomer unit having the alkyl chain with a carbon number of 10 or greater is preferably at least 10% by weight, more preferably at least 20% by weight, and even more preferably 30% by weight or greater. There are no particular limitations on the upper limit for the proportion of the monomer unit having the alkyl chain with a carbon number of 10 or greater, and the proportion may be 100% by weight, but is preferably not more than 90% by weight, and more preferably 75% by weight or less.

In addition to the alkyl chain having a carbon number of 10 or greater, the pigment dispersing resin A may also contain the type of polyoxyalkylene chain described below. In those cases where the pigment dispersing resin A contains a polyoxyalkylene chain, the ratio between the monomer unit having the alkyl chain with a carbon number of 10 or greater and the monomer unit having the polyoxyalkylene chain (monomer unit having the alkyl chain with a carbon number of 10 or greater/monomer unit having the polyoxyalkylene chain (weight ratio)) is preferably within a range from 10/0 to 6/4, more preferably within a range from 10/0 to 7/3, and even more preferably within a range from 10/0 to 8/2.

In this description, the proportion of the monomer unit having an alkyl chain with a carbon number of 10 or greater can be estimated as the ratio (weight ratio) of the blend amount of the compound having an alkyl chain with a carbon number of 10 or greater used in the synthesis of the pigment dispersing resin A.

Examples of the method used for producing the pigment dispersing resin A include a method in which the dispersing resin is produced by a polymerization reaction using a polymerizable monomer having an alkyl chain with a carbon number of 10 or greater, and a method in which the alkyl chain with a carbon number of 10 or greater is introduced at the reactive groups of a desired resin, but this is not an exhaustive list.

Examples of the pigment dispersing resin A used in the present embodiment include acrylic resins, styrene/acrylic resins, maleic acid resins, styrene/maleic acid resins, α-olefin/maleic acid resins, urethane resins and ester resins, but this is not an exhaustive list. Among these, the use of an acrylic resin or a styrene/acrylic resin is preferred.

Furthermore, in one embodiment, by introducing an aromatic ring structure into the pigment dispersing resin A, the pigment dispersibility can be further improved, and the discharge stability can be further enhanced. There are no particular limitations on the aromatic ring structure, and examples include monocyclic structures and aromatic ring structures having a 2-ring to 6-ring polycyclic structure, but a monocyclic structure or a polycyclic structure of 2 or 3 rings is preferred. Examples of the aromatic ring structure include a phenyl group, naphthyl group, anthryl group, tolyl group, xylyl group, mesityl group and anisyl group, but this is not an exhaustive list. Among these, a phenyl group or a tolyl group is preferred in terms of dispersion stability.

The acid value of the pigment dispersing resin A is preferably within a range from 30 to 400 mgKOH/g. Provided the acid value is at least 30 mgKOH/g, the solubility of the resin in water improves, which is preferable from the viewpoints of suppressing any increase in the viscosity of the ink and improving the discharge properties. Further, an acid value of not more than 400 mgKOH/g is preferred from the viewpoint of suppressing any increase in viscosity caused by an increase in interactions between the resin molecules. The acid value of the pigment dispersing resin A is more preferably within a range from 65 to 300 mgKOH/g, and even more preferably from 100 to 250 mgKOH/g.

The weight-average molecular weight of the pigment dispersing resin A is preferably within a range from 5,000 to 100,000. From the viewpoint of dispersion stability, the weight-average molecular weight is preferably at least 5,000, and from the viewpoint of the discharge properties, the weight-average molecular weight is preferably not more than 100,000. The weight-average molecular weight is more preferably within a range from 10,000 to 50,000, and even more preferably from 15,000 to 30,000.

The weight-average molecular weight of the pigment dispersing resin A in the present embodiment can be measured using normal methods. The method used for measuring the weight-average molecular weight of the pigment dispersing resin A in the present embodiment is as follows. That is, the weight-average molecular weight is the polystyrene-equivalent weight-average molecular weight measured with a GPC (HLC-8120GPC, manufactured by Tosoh Corporation) fitted with an RI detector, using a TSK gel column (manufactured by Tosoh Corporation) and using THF as the eluent.

In one embodiment of the present invention, in order to improve the solubility of the pigment dispersing resin A in water, at least a portion of the acid groups in the resin are preferably neutralized with a base. Examples of bases that may be used include ammonia water, organic bases such as dimethylaminoethanol, diethanolamine and triethanolamine, and inorganic bases such as lithium hydroxide, sodium hydroxide and potassium hydroxide. When an organic base is used, the base may sometimes volatilize during drying, thereby increasing the water resistance of the printed item, which is desirable.

The ratio between the pigment and the pigment dispersing resin A of the present embodiment (pigment/pigment dispersing resin A (weight ratio)) is preferably within a range from 2/1 to 100/1. A ratio between the pigment and the pigment dispersing resin A of 2/1 or higher is preferred from the viewpoint of suppressing any increase in the ink viscosity. Further, a ratio of 100/1 or less yields a greater improvement in the dispersibility, and is preferred from the viewpoint of stability. The ratio between the pigment and the pigment dispersing resin A is more preferably from 2.5/1 to 50/1, and even more preferably from 3/1 to 25/1.

<Pigment Dispersing Resin B>

The pigment dispersing resin B used in the present embodiment has a polyoxyalkylene chain within the structure.

The polyoxyalkylene chain is specifically represented by —$(C_mH_{2m}—O)_n$— (wherein m and n each represents an integer of 1 or greater). Representative examples include various polyoxyalkylene groups such as a polyoxymethylene group, polyoxyethylene group, polyoxypropylene group or polyoxybutylene group, as well as groups in which the above oxyalkylene portions are copolymerized randomly, such as a polyoxyethylene-oxypropylene group, and groups in which different polyoxyalkylene groups are bonded in a block-like arrangement, such as a polyoxyethylene-polyoxypropylene group. One end of the polyoxyalkylene group is bonded to a terminal group (such as a hydroxyl group, alkyl group or carboxyl group), and the other end function as the bonding point that bonds the group to the main chain. From the viewpoint of the solubility in water, m is preferably from 1 to 5, more preferably from 2 to 4, and even more preferably 2 or 3. Further, from the viewpoints of image quality and the discharge properties, n is preferably from 1 to 150, more preferably from 2 to 80, even more preferably from 3 to 50, and even further more preferably from 4 to 30.

In the present embodiment, among all of the monomer units within the pigment dispersing resin B, the proportion (weight ratio) of the monomer unit having the polyoxyalkylene chain is preferably at least 10% by weight, more preferably at least 25% by weight, and even more preferably 40% by weight or greater. There are no particular limitations on the upper limit for the proportion of the monomer unit having the polyoxyalkylene chain, and the proportion may be 100% by weight, but is preferably not more than 90% by weight, and more preferably 75% by weight or less.

In addition to the polyoxyalkylene chain, the pigment dispersing resin B may also contain the type of alkyl chain with a carbon number of 10 or greater described above. In those cases where the pigment dispersing resin B contains an alkyl chain with a carbon number of 10 or greater, the ratio of (monomer unit having the polyoxyalkylene chain/monomer unit having the alkyl chain with a carbon number of 10 or greater) (weight ratio) is preferably within a range from 10/0 to 6/4, more preferably within a range from 10/0 to 7/3, and even more preferably within a range from 10/0 to 8/2.

In this description, the proportion of the monomer unit having a polyoxyalkylene chain can be estimated as the ratio (weight ratio) of the blend amount of the compound having the (poly)oxyalkylene chain used in the synthesis of the pigment dispersing resin B.

Examples of the pigment dispersing resin B used in the present embodiment include acrylic resins, styrene/acrylic resins, maleic acid resins, styrene/maleic acid resins, α-olefin/maleic acid resins, urethane resins and ester resins. Among these, the use of an acrylic resin, styrene/acrylic resin, maleic acid resin or styrene/maleic acid resin is preferred, and a maleic acid resin or a styrene/maleic acid resin is more preferred.

When the pigment dispersing resin B used in the present embodiment is a maleic acid resin, introduction of the polyoxyalkylene chain into the maleic acid resin is preferably performed by reacting the carboxylic acid moieties with a (poly)alkylene glycol. For the (poly)alkylene glycol, any compound having a hydroxyl group can be introduced into the resin.

Examples of the compound having a (poly)oxyalkylene chain such as the (poly)alkylene glycol that is used for introducing the polyoxyalkylene group include diethylene glycol monoethyl ether, diethylene glycol monobutyl ether, diethylene glycol monohexyl ether, triethylene glycol monomethyl ether, triethylene glycol monobutyl ether, dipropylene glycol monomethyl ether, dipropylene glycol monobutyl ether, tripropylene glycol monomethyl ether, polyethylene glycol and polypropylene glycol, but this is not an exhaustive list.

When the pigment dispersing resin B used in the present embodiment is an acrylic resin, the acrylic resin having a polyoxyalkylene chain can be obtained by using a mono(meth)acrylate having a (poly)alkylene glycol group such as (poly)ethylene glycol, (poly)propylene glycol or (poly)butylene glycol as the polymerizable monomer for introducing the polyoxyalkylene chain, and copolymerizing this monomer with another (meth)acrylate monomer. Another possible synthesis method involves obtaining an acrylic resin using (meth)acrylic acid as a polymerizable monomer, and then reacting the acid groups derived from the (meth)acrylic acid with the hydroxyl group of a (poly)alkylene glycol via an esterification reaction, thus obtaining an acrylic resin having a polyoxyalkylene chain.

Furthermore, in one embodiment, by introducing an aromatic ring structure into the pigment dispersing resin B, the pigment dispersibility can be further improved, and the discharge stability can be further enhanced. There are no particular limitations on the aromatic ring structure, and examples include monocyclic structures and aromatic ring structures having a 2-ring to 6-ring polycyclic structure, but a monocyclic structure or a polycyclic structure of 2 or 3 rings is preferred. Examples of the aromatic ring structure include a phenyl group, naphthyl group, anthryl group, tolyl group, xylyl group, mesityl group and anisyl group, but this is not an exhaustive list. Among these, a phenyl group or a tolyl group is preferred in terms of dispersion stability.

The acid value of the pigment dispersing resin B is preferably within a range from 5 to 200 mgKOH/g. From the viewpoint of achieving superior image quality, the acid value of the pigment dispersing resin B is more preferably within a range from 5 to 100 mgKOH/g, and even more preferably from 10 to 90 mgKOH/g.

Furthermore, from the viewpoint of improving the wetting properties and gloss of the ink printed on top of the ink used in the substrate undercoating treatment, the acid value of the pigment dispersing resin A used in the present embodiment is preferably higher than the acid value of the pigment dispersing resin B.

The weight-average molecular weight of the pigment dispersing resin B is preferably within a range from 5,000 to 100,000. From the viewpoint of dispersion stability, the weight-average molecular weight is preferably at least 5,000, and a weight-average molecular weight of not more than 100,000 makes it easier to achieve favorable discharge properties. The weight-average molecular weight is more preferably within a range from 10,000 to 50,000, and even more preferably from 15,000 to 30,000.

The weight-average molecular weight of the pigment dispersing resin B in the present embodiment can be measured using normal methods. The method used for measuring the weight-average molecular weight of the pigment dispersing resin B in the present embodiment is as follows. That is, the weight-average molecular weight is the polystyrene-equivalent weight-average molecular weight measured with a GPC (HLC-8120GPC, manufactured by Tosoh Corporation) fitted with an RI detector, using a TSKgel column (manufactured by Tosoh Corporation) and using THF as the eluent.

In one embodiment of the present invention, in order to improve the solubility of the pigment dispersing resin B in water, at least a portion of the acid groups in the resin may be neutralized with a base. Examples of bases that may be used include ammonia water, organic bases such as dimethylaminoethanol, diethanolamine and triethanolamine, and inorganic bases such as lithium hydroxide, sodium hydroxide and potassium hydroxide.

The ratio between the pigment and the pigment dispersing resin B of the present embodiment (pigment/pigment dispersing resin B (weight ratio)) is preferably within a range from 2/1 to 100/1. A ratio between the pigment and the pigment dispersing resin B of 2/1 or higher is preferred from the viewpoint of suppressing any increase in the ink viscosity. Further, a ratio of 100/1 or less yields a greater improvement in the dispersibility, and is preferred from the viewpoint of stability. The ratio between the pigment and the pigment dispersing resin B is more preferably from 2.5/1 to 50/1, and even more preferably from 3/1 to 25/1.

In the present embodiment, the pigment dispersing resin A and the pigment dispersing resin B are different resins.

The pigment dispersing resin A may be used in the ink used for the undercoating treatment, or the pigment dispersing resin B may be used in the ink used for the undercoating treatment, but it is preferable that the pigment dispersing resin B is used in the ink used for the undercoating treatment.

Further, from the viewpoints of suppressing mixed color bleeding between the color inks and the white ink and obtaining sharp image quality, it is particularly desirable that the pigment dispersing resin used in the color inks is the pigment dispersing resin A, and the pigment dispersing resin used in the white ink is the pigment dispersing resin B.

Furthermore, the pigment dispersing resins used in the various inks that constitute the color inks (for example, a cyan ink, magenta ink and yellow ink) may be either mutually different, or the same.

<Organic Solvent>

The organic solvent used in the present embodiment can be used for purposes such as improving the wetting properties relative to the substrate, and particularly to less permeable substrates, improving the drying properties of the ink, and improving the discharge properties.

From the viewpoints of achieving excellent wetting properties even for less permeable substrates, improving the ink drying properties, and suppressing mixed color bleeding, the organic solvent preferably contains an organic solvent having a boiling point of at least 180° C. but not more than 280° C., and a surface tension of at least 20 mN/m but not more than 30 mN/m. By using an organic solvent having a surface tension within this preferred range, the wetting properties on the substrate can be further improved, smooth dot formation can be achieved, and the gloss of the printed coating film can also be improved.

Further, the surface tension in the present embodiment refers to the surface tension measured in an environment at 25° C. using the Wilhelmy method (plate method, vertical plate method). The surface tension of the organic solvent used in the present embodiment is more preferably at least 22 mN/m but not more than 30 mN/m, and even more preferably at least 24 mN/m but not more than 30 mN/m.

Any organic solvent having a boiling point of at least 180° C. but not more than 280° C. and a surface tension of at least 20 mN/m but not more than 30 mN/m may be used, either individually or in a mixture containing a plurality of solvents. Specific examples include 1,2-pentanediol, 1,2-hexanediol, ethylene glycol 2-ethylhexyl ether, diethylene glycol monobutyl ether, diethylene glycol monohexyl ether, dipropylene glycol monopropyl ether, dipropylene glycol monobutyl ether, tripropylene glycol monomethyl ether, diethylene glycol methyl butyl ether, triethylene glycol methyl butyl ether, tripropylene glycol dimethyl ether and triethylene glycol monobutyl ether, but this is not an exhaustive list.

From the viewpoints of better suppressing the mixed color bleeding that occurs between the ink used for the undercoat on the less permeable substrate and the ink printed on top of that undercoat, and obtaining superior discharge properties, the organic solvent used in the present embodiment has a boiling point that is preferably at least 180° C. but not more than 280° C., and more preferably at least 180° C. but not more than 250° C. Provided the boiling point is at least 180° C., the ink can undergo wet spreading more readily on the less permeable substrate before the ink dries, which is preferred from the viewpoint of the image quality, and a temperature of at least 180° C. is also preferred from the viewpoint of the discharge properties.

Furthermore, an organic solvent other than those described above, or a plurality of such solvents, may be used either instead of, or in combination with, the organic solvent described above having a boiling point of at least 180° C. but not more than 280° C. and a surface tension of at least 20 mN/m but not more than 30 mN/m. When an organic solvent other than those described above is used, from the viewpoint of suppressing mixed color bleeding, the proportion of the solvent is preferably not more than 30% by weight, and more preferably 20% by weight or less, of the total weight of the ink.

Specific examples of the organic solvent other than those described above include ethylene glycol monoethyl ether, ethylene glycol monobutyl ether, diethylene glycol monomethyl ether, diethylene glycol monoethyl ether, diethylene glycol monopropyl ether, diethylene glycol monopentyl ether, triethylene glycol monomethyl ether, triethylene glycol monoethyl ether, triethylene glycol monopropyl ether, tetraethylene glycol monomethyl ether, dipropylene glycol monomethyl ether, 3-methoxy-1-butanol, 3-methoxy-3-methylbutanol, diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methyl ethyl ether, triethylene glycol methyl ethyl ether, tetraethylene glycol methyl ethyl ether, tetraethylene glycol butyl methyl ether, propylene glycol monomethyl ether, propylene glycol dimethyl ether, 1,2-propanediol, 2-methyl-1,3-propanediol, 2,2-dimethyl-1,3-propanediol, 1,2-butanediol, 1,3-butanediol, 3-methyl-1,3-butanediol, 1,5-pentanediol, ethylene glycol and glycerol, but this is not an exhaustive list.

Moreover, a water-soluble nitrogen-containing solvent may also be added for the purpose of improving the adhesion to less permeable substrates.

Examples of the nitrogen-containing solvent include 2-pyrrolidone, N-methylpyrrolidone, N-ethylpyrrolidone, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β- octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide and N,N-diethyl-β-octoxypropionamide.

The total weight within the ink composition of the organic solvents used in the present embodiment is preferably at least 5% by weight but not more than 40% by weight of the total weight of the ink. From the viewpoints of achieving satisfactory wetting properties even on less permeable substrates and ensuring satisfactory drying properties in order to obtain superior image quality, the total weight of the organic solvents is more preferably at least 5% by weight but not more than 25% by weight, even more preferably at least 8% by weight but not more than 20% by weight, and particularly preferably at least 10% by weight but not more than 18% by weight, of the total weight of the ink. Provided the total weight of the organic solvents is at least 5% by weight, the moisture retention of the ink can be enhanced, which is preferred from the viewpoint of discharge stability. Further, a total weight of at least 5% by weight is also preferred from the viewpoint of suppressing any deterioration in the wetting properties on less permeable substrates. Provided the total amount of the organic solvents is not more than 40% by weight, any increases in the ink viscosity can be more easily suppressed, which is preferred from the viewpoint of discharge stability. Further, an amount of not more than 40% by weight also makes it easier to maintain the storage stability and drying properties of the ink within practically more applicable ranges, and is also preferred from the viewpoint of image quality.

<Water>

Examples of the water contained in the aqueous inkjet inks of the present embodiment include typical water containing all manner of ions, and ion-exchanged waters (deionized water), and the use of an ion-exchanged water (deionized water) is preferred.

The amount of water that can be used in the present embodiment is preferably from 20 to 80% by weight, more preferably from 30 to 75% by weight, and even more preferably within a range from 40 to 70% by weight, of the total weight of the ink.

<Pigments>

Conventionally known pigments can be used as the pigments contained in the aqueous inks of the present embodiment.

Examples of cyan pigments that can be used in the present embodiment include C.I. Pigment Blue 1, 2, 3, 15:3, 15:4, 16 and 22, and C.I. Vat Blue 4 and 6.

Examples of magenta pigments that can be used in the present embodiment include C.I. Pigment Red 5, 7, 12, 22, 23, 31, 48 (Ca), 48 (Mn), 49, 52, 53, 57 (Ca), 57:1, 112 and 122, Quinacridone solid solutions 146, 147, 150, 238 and 269, and C.I. Pigment Violet 19.

Examples of yellow pigments that can be used in the present embodiment include C.I. Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185 and 213.

Examples of black pigments that can be used in the present embodiment include carbon blacks produced using the furnace method or the channel method. For example, carbon blacks produced in this manner and having properties including a primary particle size of 11 to 40 mµm (nm), a specific surface area measured by the BET method of 50 to 400 m$^2$/g, a volatile fraction of 0.5 to 10% by weight, and a pH value of 2 to 10 are suitable. Examples of commercially available carbon blacks having these types of properties include the following products. That is, specific examples include No. 33, 40, 45, 52, 900, 2200B, 2300, MA7, MA8 and MCF88 (all manufactured by Mitsubishi Chemical Corporation), RAVEN 1255 (manufactured by Columbian Chemicals Co., Inc.), REGAL 330R, 400R and 660R, and MOGUL L (all manufactured by Cabot Corporation), and Nipex 160IQ, Nipex 170IQ, Nipex 75, Printex 85, Printex 95, Printex 90, Printex 35 and Printex U (all manufactured by Degussa AG), and any of these products can be used favorably.

Examples of white pigments that can be used in the present embodiment include basic lead carbonate ($2PbCO_3Pb(OH)_2$, so-called "silver white"), zinc oxide (ZnO, so-called "zinc white"), titanium oxide ($TiO_2$, so-called "titanium white") and strontium titanate ($SrTiO_3$, so-called "titanium strontium white"), and among these, titanium oxide is preferred. The inorganic particles used in the white pigment may be a simple substance, an oxide or organometallic compound of silicon, aluminum, zirconium, or titanium or the like, or composite particles with an organic compound. Compared with other white pigments, titanium oxide has a small specific gravity, a large refractive index, and is chemically and physically stable, and therefore exhibits its good hiding power and tinting strength as a pigment, and also exhibits excellent durability in acidic, alkaline, and other environments. Accordingly, the use of titanium oxide as the white pigment is preferred. If necessary, a white pigment other than those described above may also be used.

The primary particle size of the pigment can be measured using normal methods. In the present description, the primary particle size of a pigment means the average primary particle size determined by dripping the pigment dispersion onto a support film and drying the dispersion, subsequently inspecting the dried film using a transmission electron microscope, and calculating the arithmetic mean of the particle sizes (equivalent circle diameters) of 1,000 randomly selected particles.

The present embodiment is not limited to the pigments described above, and ink sets that include combinations with other colors such as orange and green using pigments other than those described above, or with clear inks containing no pigment, may also be used.

The amount of pigment that can be used in the present embodiment is preferably within a range from 0.1 to 20% by weight, and more preferably from 0.5 to 15% by weight, of the total ink composition.

<Binder Resin>

The aqueous inkjet inks of the present embodiment may also include a binder resin to improve the drying properties of the ink on less permeable substrates and the coating film durability of the printed items. Binder resins for aqueous inks can be broadly classified as water-soluble resins or water-dispersible resin microparticles (hereafter also referred to as simply "resin microparticles"). Among these, the use of water-dispersible resin microparticles as the binder resin is preferred. Resin microparticles generally have a higher molecular weight than water-soluble resins, and tend to enable a higher level of durability to be achieved. Further, resin microparticles can lower the ink viscosity, meaning a larger amount of resin can be included in the ink, and can therefore be said to be suitable for enhancing the durability of the inkjet ink. Examples of different varieties of the resin microparticles include acrylic-based microparticles, urethane-based microparticles, styrene/butadiene-based microparticles, vinyl chloride-based microparticles and polyolefin-based microparticles.

In one embodiment, by increasing the glass transition temperature (Tg) of the water-dispersible resin microparticles, the durability such as the abrasion resistance and the chemical resistance can be further improved. The glass transition temperature (Tg) of the water-dispersible resin microparticles is preferably within a range from 50 to 100° C., and more preferably within a range from 75 to 90° C. A glass transition temperature (Tg) of at least 50° C. enables favorable durability to be more easily obtained, and is also preferred from the viewpoint of suppressing peeling of the printing from the printed item in actual applications. Further, a glass transition temperature (Tg) of not more than 100° C. enables the hardness of the coating film to be more easily maintained within an appropriate range, and is also preferred from the viewpoint of suppressing the occurrence of cracking or splitting of the printed surface when the printed item is folded. The glass transition temperature is a value determined using a DSC (differential scanning calorimeter).

Measurement of the glass transition temperature using a DSC (differential scanning calorimeter) can be performed in the following manner. First, a sample of about 2 mg of the dried and solidified binder resin composition is weighed onto an aluminum pan, the test container is then set on the DSC measurement holder, and the endothermic peak value is read from the chart obtained at a rate of temperature increase of 5° C./minute. This peak temperature is used as the glass transition temperature in the present description.

Further, the water-dispersible resin microparticles not only enhance the durability of the coating film on the printed product, but also promote more rapid film formation after impact of the liquid droplets, thus providing an effect of suppressing bleeding between ink liquid droplets, and therefore enable superior image quality to be obtained with little bleeding between colors.

The amount of the above type of water-dispersible resin microparticles within the ink composition, reported as a non-volatile fraction, is preferably at least 3% by weight but not more than 20% by weight, and more preferably at least 5% by weight but not more than 15% by weight, of the total weight of the ink.

<Surfactants>

The aqueous inkjet inks of the present embodiment may also include a surfactant (hereafter sometimes referred to as simply an "activator") for the purposes of adjusting the surface tension and ensuring favorable wetting properties of the substrate, and particularly of less permeable substrates. Examples of known surfactants are numerous, and include acetylene-based surfactants, silicon-based surfactants, acrylic-based surfactants and fluorine-based surfactants, which may be selected in accordance with the application, but from the viewpoint of satisfactorily reducing the surface tension of the ink to ensure superior wetting properties, the use of a silicon-based surfactant is preferred. An example of the amount added of the surfactant is preferably at least 0.1% by weight but not more than 5% by weight, and more preferably at least 0.2% by weight but not more than 4% by weight, relative to the total weight of the ink.

<Other Components>

Furthermore, besides the components described above, each of the inks of the present embodiment may also optionally include additives such as anti-foaming agents and preservatives, which may be added as required to impart the ink with desired physical properties. An example of the amount added of these additives is preferably at least 0.01% by weight but not more than 10% by weight relative to the total weight of the ink.

<Method for Preparing Inks>

Examples of the method used for preparing an ink of the present embodiment containing the types of components described above are described below. The method for preparing the inks of the present embodiment includes, but not limited to, the following methods. First, the pigment is added to an aqueous medium containing a mixture of at least a pigment dispersant (for example, the pigment dispersing resin) and water, and following mixing and stirring, a dispersion treatment is performed using the dispersion device described below, and an additional centrifugal separation treatment is performed as required, thus obtaining the desired pigment dispersion. Subsequently, an organic solvent, and preferably a water-soluble organic solvent, and/or any appropriately selected additive components described above are added to the pigment dispersion as required, and the dispersion is then mixed and filtered where necessary to obtain an ink of the present embodiment.

In the method for preparing an ink according to this embodiment, as described above, a pigment dispersion obtained by performing a dispersion treatment is used in the ink preparation, but it is effective to conduct premixing prior to the dispersion treatment performed during the pigment dispersion preparation. In other words, premixing may be performed by adding the pigment to an aqueous medium containing a mixture of at least the pigment dispersing resin and water (hereafter sometimes referred to as an "aqueous solution"). This type of premixing operation is preferable, as it improves the wetting properties of the pigment surface and can promote the adsorption of the dispersant to the pigment surface.

The dispersion device used during the dispersion treatment of the pigment may be any commonly used dispersion device, and examples include a ball mill, roll mill, sand mill, beads mill, and nanomizer. Among these, a beads mill can be used particularly favorably. Specific examples of such beads mills include a Super Mill, Sand Grinder, Agitator Mill, Glen Mill, Dyno Mill, Pearl Mill and Cobol Mill (all of which are brand names).

Moreover, in the premixing and the dispersion treatment of the pigment, the pigment dispersant (for example, the pigment dispersing resin) may be dissolved or dispersed in only water, or may be dissolved or dispersed in a mixed solvent containing an organic solvent and water.

Because the inks of the present embodiment are designed for inkjet recording, pigments having an optimal particle size distribution are preferably used as the pigments. In other words, in order to ensure that each of the inks containing the pigment particles can be used favorably in an inkjet recording method, and in view of the requirements such as resistance to nozzle blockages, it is preferable to use pigments having an optimal particle size distribution. Examples of methods that can be used for obtaining pigments having a desired particle size distribution include the following methods. Specific techniques include reducing the size of the grinding media used in the types of dispersion devices described above, increasing the fill ratio of the grinding media, lengthening the treatment time, performing additional classification by filtering or centrifugal separation after the grinding treatment, and combinations of these techniques.

<Less Permeable Substrates>

The ink set for inkjet recording of the present embodiment can be used favorably on less permeable substrates. The term "less permeable substrates" describes recording media which are resistant to water absorption or for which the absorption rate is slow. Examples of such substrates include plastic substrates such as polycarbonate, hard polyvinyl chloride, soft polyvinyl chloride, polystyrene, styrofoam, PMMA, polypropylene, polyethylene and PET, metal substrates such as aluminum, stainless steel, and glass and timber, although this is not an exhaustive list. The ink set for inkjet recording of the present embodiment can also be used favorably on substrates other than these less permeable substrates, including plain paper and fabric and the like.

<Undercoating Treatment>

The undercoating treatment used in the present embodiment is a treatment of applying the white ink or a color ink to a portion of, or the entire surface of, the type of substrate described above, thereby altering the base color of the substrate to either white or the color of the color ink. During this treatment, if the substrate is transparent, then the discharge amount must be controlled so as to achieve satisfactory opacity. By first printing one of either a color ink or the white ink onto the above substrate to perform an undercoating treatment of the substrate, and subsequently printing the other ink on top of the undercoat, a sharp image with superior coloration can be obtained.

<Printing Method>

Although there are no particular limitations on the method used for printing the ink set of the present embodiment, a method in which, for example, one of a color ink or the white ink of the present embodiment is first printed onto the printing substrate as an undercoating treatment, and the other ink is then printed on top of the undercoat is preferred. Further, adhering the ink liquid droplets to the printing substrate while the printing substrate is heated at 40 to 80° C. is also preferred. By printing the ink set of the present embodiment using the printing method described above, a high-quality printed item can be obtained. The heating temperature is more preferably within a range from 45 to 70° C., and even more preferably from 50 to 60° C.

The present invention also relates to the items described below.

(1) An ink set for inkjet recording comprising at least a white ink and color inks including a cyan ink, a magenta ink and a yellow ink, wherein
each ink independently comprises a pigment, a pigment dispersing resin, an organic solvent, and water,
the pigment dispersing resin of each color ink is a pigment dispersing resin A having an alkyl chain with a carbon number of 10 or greater, and
the pigment dispersing resin of the white ink is a pigment dispersing resin B having a polyoxyalkylene chain.

(2) An ink set for inkjet recording comprising at least a white ink and color inks including a cyan ink, a magenta ink and a yellow ink, wherein
each ink independently comprises a pigment, a pigment dispersing resin, an organic solvent and water,
the pigment dispersing resin of each color ink is a pigment dispersing resin B having a polyoxyalkylene chain, and
the pigment dispersing resin of the white ink is a pigment dispersing resin A having an alkyl chain with a carbon number of 10 or greater.

(3) The ink set for inkjet recording disclosed above in (1) or (2), comprising an organic solvent having a boiling point of at least 180° C. but not more than 280° C. and a surface tension of at least 20 mN/m but not more than 30 mN/m as the organic solvent.

(4) The ink set for inkjet recording disclosed above in any one of (1) to (3), wherein the acid value of the pigment dispersing resin A is higher than the acid value of the pigment dispersing resin B.

(5) The ink set for inkjet recording disclosed above in any one of (1) to (4), wherein the pigment dispersing resin A and the pigment dispersing resin B each have an aromatic ring structure.

(6) An inkjet printing method for adhering ink liquid droplets to a printing substrate while heating the printing substrate at 40 to 80° C., the method comprising subjecting the printing substrate to an undercoating treatment by printing one of either a color ink or a white ink onto the printing substrate, and subsequently printing the other of the color ink or the white ink on top of the undercoat, wherein the ink set for inkjet recording disclosed above in any one of (1) to (5) is used as the color ink and the white ink.

EXAMPLES

Embodiments of the present invention are described below in further detail using a series of examples and comparative examples. In the following description, unless specifically stated otherwise, the units "parts" and "%" represent "parts by weight" and "% by weight" respectively.

<Production Example for Pigment Dispersing Resin 1>

A reaction container fitted with a gas inlet tube, a thermometer, a condenser and a stirrer was charged with 93.4 parts of butanol, and the interior of the container was flushed with nitrogen gas. The contents of the reaction container were heated to 110° C., and a mixture containing 90 parts of lauryl methacrylate and 10 parts of acrylic acid as polymerizable monomers and 6 parts of a polymerization initiator V-601 (manufactured by Wako Pure Chemical Industries, Ltd.) was added dropwise to the container over a period of two hours to perform a polymerization reaction. Following completion of the dropwise addition, reaction was continued at 110° C. for a further three hours, an additional 0.6 parts of V-601 (manufactured by Wako Pure Chemical Industries, Ltd.) was then added, and the reaction was continued at 110° C. for a further one hour, thus obtaining a solution of a pigment dispersing resin 1. Following cooling to room temperature, 37.1 parts of dimethylaminoethanol was added to neutralize the solution, and 100 parts of water was added to generate an aqueous solution. Subsequently, the mixture was heated to at least 100° C., and the butanol was removed by azeotropic distillation with the water to adjust the solid fraction concentration to 50%. This yielded an aqueous solution of the pigment dispersing resin 1 with a solid fraction of 50%.

<Production Examples for Pigment Dispersing Resins 2 to 6, 11, and 13 to 16>

With the exception of using the polymerizable monomers shown in Table 1 as the polymerizable monomers, aqueous solutions of pigment dispersing resins 2 to 6, 11, and 13 to 16, each having a solid fraction of 50%, were obtained using the same procedure as that described for the pigment dispersing resin 1.

<Production Example for Pigment Dispersing Resin 7>

A reaction container fitted with a gas inlet tube, a thermometer, a condenser and a stirrer was charged with 200 parts of benzene, and the interior of the container was flushed with nitrogen gas. The contents of the reaction container were heated to 80° C., and a mixture containing 15 parts of maleic anhydride and 85 parts of acrylic acid (in Table 1, the same amount as the amount of PEG400) as polymerizable monomers and 6 parts of a polymerization initiator V-601 (manufactured by Wako Pure Chemical Industries, Ltd.) was added dropwise to the container over a period of two hours to perform a polymerization reaction.

Following completion of the dropwise addition, reaction was continued at 80° C. for a further 4 hours, an additional 0.6 parts of V-601 was then added, and the reaction was continued at 80° C. for a further one hour. Subsequently, the heating was continued under reduced pressure, and following removal of the benzene by distillation, 300 parts of butanol was added, thus obtaining a butanol solution of a resin having carboxyl groups derived from the maleic anhydride structure and the acrylic acid.

Subsequently, 200 parts of a polyethylene glycol (400) and 1 part of tetraisopropyl orthotitanate were added to the above butanol solution, and by heating the mixture at 110° C. for 4 hours, the maleic anhydride portions underwent hydrolysis and ring-opening, and the carboxyl groups derived from maleic acid formed as a result of this ring-opening and the carboxyl groups derived from the acrylic acid were esterified by the polyethylene glycol (400), yielding a solution of a pigment dispersing resin 7. Subsequently, following cooling to room temperature, 100 parts of water was added to generate an aqueous solution, the mixture was then heated to at least 100° C., and the butanol was removed by azeotropic distillation with the water to adjust the solid fraction concentration to 50%, thus obtaining an aqueous solution of the pigment dispersing resin 7 with a solid fraction of 50%.

<Production Examples for Pigment Dispersing Resins 8 to 10, and 12>

With the exceptions of using the polymerizable monomers shown in Table 1 as the polymerizable monomers, and using the polyoxyalkylene group-containing compound shown in Table 1, aqueous solutions of pigment dispersing resins 8 to 10, and 12, each having a solid fraction of 50%, were obtained using the same procedure as that described for the pigment dispersing resin 7.

TABLE 1

| | Monomer components | | | | | | | | | | | | | |
|---|---|---|---|---|---|---|---|---|---|---|---|---|---|---|
| | Containing an alkyl chain with a carbon number of 10 or greater | | | Containing an aromatic ring structure | | Containing a carboxyl group | | | | Containing a polyoxyalkylene group | | | Dispersing resin structure | Acid value | Weight average molecular weight |
| | LMA | STMA | VA | St | AS-6 | MAA | AA | MAH | 2EHMA | EDG | PEG400 | MPEA | | | |
| Dispersing resin 1 | 90 | | | | | 10 | | | | | | | A | 35 | 20000 |
| Dispersing resin 2 | 70 | | | | | 30 | | | | | | | A | 130 | 25000 |
| Dispersing resin 3 | 35 | | | 35 | | 30 | | | | | | | A | 140 | 26000 |
| Dispersing resin 4 | 35 | | | 55 | | 10 | | | | | | | A | 35 | 30000 |
| Dispersing resin 5 | | | 35 | 35 | | 30 | | | | | | | A | 150 | 32000 |
| Dispersing resin 6 | | | | 35 | | 30 | | 30 | | | | | | 140 | 25000 |
| Dispersing resin 7 | | | | | | 15 | | | | | 85 | | B | 60 | 28000 |
| Dispersing resin 8 | | | | 35 | | 15 | | | | | 50 | | B | 70 | 32000 |
| Dispersing resin 9 | | | | 35 | | 15 | | | | 50 | | | B | 75 | 30000 |
| Dispersing resin 10 | | | | 35 | | | 50 | | | | 15 | | B | 180 | 22000 |
| Dispersing resin 11 | | 35 | | 20 | 15 | 15 | | | | | | 15 | A + B | 125 | 20000 |
| Dispersing resin 12 | 15 | | | 20 | | 15 | 10 | | | | 40 | | A + B | 100 | 31000 |
| Dispersing resin 13 | | 35 | | 25 | 20 | 20 | | | | | | | A | 145 | 20000 |
| Dispersing resin 14 | | | | 25 | 20 | 15 | | | | | | 40 | B | 110 | 18000 |
| Dispersing resin 15 | 20 | | | 35 | | 45 | | | | | | | A | 240 | 30000 |
| Dispersing resin 16 | | | | 55 | | 5 | | | | | | 40 | B | 15 | 25000 |

In the column labeled "dispersing resin structure" in Table 1, the entry "A+B" describes a structure having both an alkyl chain with a carbon number of 10 or greater and a polyoxyalkylene chain. Other abbreviations used in Table 1 are as follows.

LMA: lauryl methacrylate
STMA: stearyl methacrylate
VA: behenyl acrylate
St: styrene
AS-6: polystyrene macromonomer ("AS-6", manufactured by Toagosei Co., Ltd.)
MAA: methacrylic acid
AA: acrylic acid
MAH: maleic anhydride
2EHMA: 2-ethylhexyl methacrylate
EDG: diethylene glycol monoethyl ether
PEG400: polyethylene glycol (400)
MPEA: methoxy polyethylene glycol acrylate ("Light Acrylate 130A", manufactured by Kyoeisha Chemical Co., Ltd.)

<Production Example for Cyan Pigment Dispersion 1 (CB1)>

Twenty parts of Pigment Blue 15:3 as a pigment, 12 parts of the aqueous solution of the pigment dispersing resin 1 and 68 parts of water were mixed, and following preliminary dispersion using a Disper, a Dyno Mill with a capacity of 0.6 L filled with 1,800 g of zirconia beads having a diameter of 0.5 mm was used to disperse the mixture for two hours, thus obtaining a cyan pigment dispersion 1 (CB1).

<Production Examples for Cyan Pigment Dispersions 2 to 15 (CB2 to CB15)>

As shown in Table 2, with the exception of using the pigment dispersing resins 2 to 15 as the pigment dispersing resin, pigment dispersion was conducted using the same procedure as that described for the cyan pigment dispersion 1 (CB1), thus obtaining cyan pigment dispersions 2 to 15 (CB2 to CB15).

TABLE 2

|  | Pigment | Dispersing resin | | Water |
|---|---|---|---|---|
|  |  | Type | Amount |  |
| CB1 | 20 | 1 | 12 | remainder |
| CB2 | 20 | 2 | 12 | remainder |
| CB3 | 20 | 3 | 12 | remainder |
| CB4 | 20 | 4 | 12 | remainder |
| CB5 | 20 | 5 | 12 | remainder |
| CB6 | 20 | 6 | 12 | remainder |
| CB7 | 20 | 7 | 12 | remainder |
| CB8 | 20 | 8 | 12 | remainder |
| CB9 | 20 | 9 | 12 | remainder |
| CB10 | 20 | 10 | 12 | remainder |
| CB11 | 20 | 11 | 12 | remainder |
| CB12 | 20 | 12 | 12 | remainder |
| CB13 | 20 | 13 | 12 | remainder |
| CB14 | 20 | 14 | 12 | remainder |
| CB15 | 20 | 15 | 12 | remainder |

<Production Example for Magenta Pigment Dispersion 1 (MB1)>

Twenty parts of Pigment Red 122 as a pigment, 12 parts of the aqueous solution of the pigment dispersing resin 1 and 68 parts of water were mixed, and following preliminary dispersion using a Disper, a Dyno Mill with a capacity of 0.6 L filled with 1,800 g of zirconia beads having a diameter of 0.5 mm was used to disperse the mixture for two hours, thus obtaining a magenta pigment dispersion 1 (MB1).

<Production Examples for Magenta Pigment Dispersions 2 to 15 (MB2 to MB15)>

As shown in Table 3, with the exception of using the pigment dispersing resins 2 to 15 as the pigment dispersing resin, pigment dispersion was conducted using the same procedure as that described for the magenta pigment dispersion 1 (MB1), thus obtaining magenta pigment dispersions 2 to 15 (MB2 to MB15).

TABLE 3

|  | Pigment | Dispersing resin | | Water |
|---|---|---|---|---|
|  |  | Type | Amount |  |
| MB1 | 20 | 1 | 12 | remainder |
| MB2 | 20 | 2 | 12 | remainder |
| MB3 | 20 | 3 | 12 | remainder |
| MB4 | 20 | 4 | 12 | remainder |
| MB5 | 20 | 5 | 12 | remainder |
| MB6 | 20 | 6 | 12 | remainder |
| MB7 | 20 | 7 | 12 | remainder |
| MB8 | 20 | 8 | 12 | remainder |
| MB9 | 20 | 9 | 12 | remainder |
| MB10 | 20 | 10 | 12 | remainder |
| MB11 | 20 | 11 | 12 | remainder |

TABLE 3-continued

|  | Pigment | Dispersing resin | | Water |
|---|---|---|---|---|
|  |  | Type | Amount |  |
| MB12 | 20 | 12 | 12 | remainder |
| MB13 | 20 | 13 | 12 | remainder |
| MB14 | 20 | 14 | 12 | remainder |
| MB15 | 20 | 15 | 12 | remainder |

<Production Example for Yellow Pigment Dispersion 1 (YB1)>

Twenty parts of Pigment Yellow 120 as a pigment, 12 parts of the aqueous solution of the pigment dispersing resin 1 and 68 parts of water were mixed, and following preliminary dispersion using a Disper, a Dyno Mill with a capacity of 0.6 L filled with 1,800 g of zirconia beads having a diameter of 0.5 mm was used to disperse the mixture for two hours, thus obtaining a yellow pigment dispersion 1 (YB1).

<Production Examples for Yellow Pigment Dispersions 2 to 15 (YB2 to YB15)>

As shown in Table 4, with the exception of using the pigment dispersing resins 2 to 15 as the pigment dispersing resin, pigment dispersion was conducted using the same procedure as that described for the yellow pigment dispersion 1 (YB1), thus obtaining yellow pigment dispersions 2 to 15 (YB2 to YB15).

TABLE 4

|  | Pigment | Dispersing resin | | Water |
|---|---|---|---|---|
|  |  | Type | Amount |  |
| YB1 | 20 | 1 | 12 | remainder |
| YB2 | 20 | 2 | 12 | remainder |
| YB3 | 20 | 3 | 12 | remainder |
| YB4 | 20 | 4 | 12 | remainder |
| YB5 | 20 | 5 | 12 | remainder |
| YB6 | 20 | 6 | 12 | remainder |
| YB7 | 20 | 7 | 12 | remainder |
| YB8 | 20 | 8 | 12 | remainder |
| YB9 | 20 | 9 | 12 | remainder |
| YB10 | 20 | 10 | 12 | remainder |
| YB11 | 20 | 11 | 12 | remainder |
| YB12 | 20 | 12 | 12 | remainder |
| YB13 | 20 | 13 | 12 | remainder |
| YB14 | 20 | 14 | 12 | remainder |
| YB15 | 20 | 15 | 12 | remainder |

<Production Example for Black Pigment Dispersion 1 (KB1)>

Twenty parts of carbon black as a pigment, 12 parts of the aqueous solution of the pigment dispersing resin 1 and 68 parts of water were mixed, and following preliminary dispersion using a Disper, a Dyno Mill with a capacity of 0.6 L filled with 1,800 g of zirconia beads having a diameter of 0.5 mm was used to disperse the mixture for two hours, thus obtaining a black pigment dispersion 1 (KB1).

<Production Examples for Black Pigment Dispersions 2 to 15 (KB2 to KB15)>

As shown in Table 5, with the exception of using the pigment dispersing resins 2 to 15 as the pigment dispersing resin, pigment dispersion was conducted using the same procedure as that described for the black pigment dispersion 1 (KB1), thus obtaining black pigment dispersions 2 to 15 (KB2 to KB15).

TABLE 5

|  | Pigment | Dispersing resin Type | Amount | Water |
|---|---|---|---|---|
| KB1 | 20 | 1 | 12 | remainder |
| KB2 | 20 | 2 | 12 | remainder |
| KB3 | 20 | 3 | 12 | remainder |
| KB4 | 20 | 4 | 12 | remainder |
| KB5 | 20 | 5 | 12 | remainder |
| KB6 | 20 | 6 | 12 | remainder |
| KB7 | 20 | 7 | 12 | remainder |
| KB8 | 20 | 8 | 12 | remainder |
| KB9 | 20 | 9 | 12 | remainder |
| KB10 | 20 | 10 | 12 | remainder |
| KB11 | 20 | 11 | 12 | remainder |
| KB12 | 20 | 12 | 12 | remainder |
| KB13 | 20 | 13 | 12 | remainder |
| KB14 | 20 | 14 | 12 | remainder |
| KB15 | 20 | 15 | 12 | remainder |

TABLE 6

|  | Pigment | Dispersing resin Type | Amount | Water |
|---|---|---|---|---|
| WB1 | 60 | 1 | 18 | remainder |
| WB2 | 60 | 2 | 18 | remainder |
| WB3 | 60 | 3 | 18 | remainder |
| WB4 | 60 | 4 | 18 | remainder |
| WB5 | 60 | 5 | 18 | remainder |
| WB6 | 60 | 6 | 18 | remainder |
| WB7 | 60 | 7 | 18 | remainder |
| WB8 | 60 | 8 | 18 | remainder |
| WB9 | 60 | 9 | 18 | remainder |
| WB10 | 60 | 10 | 18 | remainder |
| WB11 | 60 | 11 | 18 | remainder |
| WB12 | 60 | 12 | 18 | remainder |
| WB13 | 60 | 13 | 18 | remainder |
| WB14 | 60 | 14 | 18 | remainder |
| WB16 | 60 | 16 | 18 | remainder |

<Production Example for White Pigment Dispersion 1 (WB1)>

Sixty parts of titanium oxide as a pigment, 18 parts of the aqueous solution of the pigment dispersing resin 1 and 22 parts of water were mixed, and following preliminary dispersion using a Disper, a Dyno Mill with a capacity of 0.6 L filled with 1,800 g of zirconia beads having a diameter of 0.5 mm was used to disperse the mixture for two hours, thus obtaining a white pigment dispersion 1 (WB1).

<Production Examples for White Pigment Dispersions 2 to 14, 16 (WB2 to WB14, WB16)>

As shown in Table 6, with the exception of using the pigment dispersing resins 2 to 14, 16 as the pigment dispersing resin, pigment dispersion was conducted using the same procedure as that described for the white pigment dispersion 1 (WB1), thus obtaining white pigment dispersions 2 to 14, 16 (WB2 to WB14, WB16).

<Production Example for Cyan Ink 1 (C1)>

A mixture was prepared containing 15 parts of the cyan pigment dispersion (CB1), 15 parts of 1,2-butanediol, 20 parts of a resin microparticles dispersion (an acrylic emulsion, solid fraction: 40%, resin Tg: 80° C.), 0.5 parts of an activator (a silicon-based activator TegoGlide 432, manufactured by Evonik Degussa GmbH), and the remainder in water to make the total amount of the ink up to 100 parts, and this mixture was stirred thoroughly using a Disper until uniform. Subsequently, the mixture was filtered through a membrane filter to remove the types of coarse particles that can cause head blockages, thus completing preparation of a cyan ink 1 (C1).

<Production Examples for Cyan Inks 2 to 26 (C2 to C26), Inks of Other Colors, and White Inks>

Using the raw materials shown in Tables 7, 8, 9, 10 and 11, inks were prepared in a similar manner to the production example for the cyan ink 1 (C1).

TABLE 7

|  | Cyan pigment dispersion | | Organic solvent | | | | | | Resin | | |
|---|---|---|---|---|---|---|---|---|---|---|---|
|  | CB | amount | BuD | HexD | EDG | BDG | MB | BTG | microparticles | Activator | Water |
| C1 | 1 | 15 | 15 |  |  |  |  |  | 20 | 0.5 | remainder |
| C2 | 2 | 15 | 15 |  |  |  |  |  | 20 | 0.5 | remainder |
| C3 | 3 | 15 | 15 |  |  |  |  |  | 20 | 0.5 | remainder |
| C4 | 7 | 15 | 15 |  |  |  |  |  | 20 | 0.5 | remainder |
| C5 | 8 | 15 | 15 |  |  |  |  |  | 20 | 0.5 | remainder |
| C6 | 3 | 15 |  | 15 |  |  |  |  | 20 | 0.5 | remainder |
| C7 | 3 | 15 |  |  | 15 |  |  |  | 20 | 0.5 | remainder |
| C8 | 3 | 15 |  |  |  | 15 |  |  | 20 | 0.5 | remainder |
| C9 | 3 | 15 |  |  |  |  | 15 |  | 20 | 0.5 | remainder |
| C10 | 3 | 15 |  |  |  |  |  | 15 | 20 | 0.5 | remainder |
| C11 | 1 | 15 |  |  | 15 |  |  |  | 20 | 0.5 | remainder |
| C12 | 2 | 15 |  |  | 15 |  |  |  | 20 | 0.5 | remainder |
| C13 | 4 | 15 |  |  | 15 |  |  |  | 20 | 0.5 | remainder |
| C14 | 5 | 15 |  |  | 15 |  |  |  | 20 | 0.5 | remainder |
| C15 | 7 | 15 |  |  | 15 |  |  |  | 20 | 0.5 | remainder |
| C16 | 8 | 15 |  |  | 15 |  |  |  | 20 | 0.5 | remainder |
| C17 | 9 | 15 |  |  | 15 |  |  |  | 20 | 0.5 | remainder |
| C18 | 10 | 15 |  |  | 15 |  |  |  | 20 | 0.5 | remainder |
| C19 | 3 | 15 |  |  | 9 |  |  |  | 20 | 0.5 | remainder |
| C20 | 3 | 15 |  |  | 25 |  |  |  | 20 | 0.5 | remainder |
| C21 | 6 | 15 |  |  | 15 |  |  |  | 20 | 0.5 | remainder |
| C22 | 11 | 15 |  |  | 15 |  |  |  | 20 | 0.5 | remainder |
| C23 | 12 | 15 |  |  | 15 |  |  |  | 20 | 0.5 | remainder |
| C24 | 13 | 15 |  |  | 15 |  |  |  | 20 | 0.5 | remainder |
| C25 | 14 | 15 |  |  | 15 |  |  |  | 20 | 0.5 | remainder |
| C26 | 15 | 15 |  |  | 15 |  |  |  | 20 | 0.5 | remainder |

TABLE 8

| | Magenta pigment dispersion | | Organic solvent | | | | | | Resin | | |
|---|---|---|---|---|---|---|---|---|---|---|---|
| | MB | amount | BuD | HexD | EDG | BDG | MB | BTG | microparticles | Activator | Water |
| M1 | 1 | 15 | 15 | | | | | | 20 | 0.5 | remainder |
| M2 | 2 | 15 | 15 | | | | | | 20 | 0.5 | remainder |
| M3 | 3 | 15 | 15 | | | | | | 20 | 0.5 | remainder |
| M4 | 7 | 15 | 15 | | | | | | 20 | 0.5 | remainder |
| M5 | 8 | 15 | 15 | | | | | | 20 | 0.5 | remainder |
| M6 | 3 | 15 | | 15 | | | | | 20 | 0.5 | remainder |
| M7 | 3 | 15 | | | 15 | | | | 20 | 0.5 | remainder |
| M8 | 3 | 15 | | | | 15 | | | 20 | 0.5 | remainder |
| M9 | 3 | 15 | | | | | 15 | | 20 | 0.5 | remainder |
| M10 | 3 | 15 | | | | | | 15 | 20 | 0.5 | remainder |
| M11 | 1 | 15 | | 15 | | | | | 20 | 0.5 | remainder |
| M12 | 2 | 15 | | 15 | | | | | 20 | 0.5 | remainder |
| M13 | 4 | 15 | | 15 | | | | | 20 | 0.5 | remainder |
| M14 | 5 | 15 | | 15 | | | | | 20 | 0.5 | remainder |
| M15 | 7 | 15 | | 15 | | | | | 20 | 0.5 | remainder |
| M16 | 8 | 15 | | 15 | | | | | 20 | 0.5 | remainder |
| M17 | 9 | 15 | | 15 | | | | | 20 | 0.5 | remainder |
| M18 | 10 | 15 | | 15 | | | | | 20 | 0.5 | remainder |
| M19 | 3 | 15 | | 9 | | | | | 20 | 0.5 | remainder |
| M20 | 3 | 15 | | 25 | | | | | 20 | 0.5 | remainder |
| M21 | 6 | 15 | | 15 | | | | | 20 | 0.5 | remainder |
| M22 | 11 | 15 | | 15 | | | | | 20 | 0.5 | remainder |
| M23 | 12 | 15 | | 15 | | | | | 20 | 0.5 | remainder |
| M24 | 13 | 15 | | 15 | | | | | 20 | 0.5 | remainder |
| M25 | 14 | 15 | | 15 | | | | | 20 | 0.5 | remainder |
| M26 | 15 | 15 | | 15 | | | | | 20 | 0.5 | remainder |

TABLE 9

| | Yellow pigment dispersion | | Organic solvent | | | | | | Resin | | |
|---|---|---|---|---|---|---|---|---|---|---|---|
| | YB | amount | BuD | HexD | EDG | BDG | MB | BTG | microparticles | Activator | Water |
| Y1 | 1 | 15 | 15 | | | | | | 20 | 0.5 | remainder |
| Y2 | 2 | 15 | 15 | | | | | | 20 | 0.5 | remainder |
| Y3 | 3 | 15 | 15 | | | | | | 20 | 0.5 | remainder |
| Y4 | 7 | 15 | 15 | | | | | | 20 | 0.5 | remainder |
| Y5 | 8 | 15 | 15 | | | | | | 20 | 0.5 | remainder |
| Y6 | 3 | 15 | | 15 | | | | | 20 | 0.5 | remainder |
| Y7 | 3 | 15 | | | 15 | | | | 20 | 0.5 | remainder |
| Y8 | 3 | 15 | | | | 15 | | | 20 | 0.5 | remainder |
| Y9 | 3 | 15 | | | | | 15 | | 20 | 0.5 | remainder |
| Y10 | 3 | 15 | | | | | | 15 | 20 | 0.5 | remainder |
| Y11 | 1 | 15 | | 15 | | | | | 20 | 0.5 | remainder |
| Y12 | 2 | 15 | | 15 | | | | | 20 | 0.5 | remainder |
| Y13 | 4 | 15 | | 15 | | | | | 20 | 0.5 | remainder |
| Y14 | 5 | 15 | | 15 | | | | | 20 | 0.5 | remainder |
| Y15 | 7 | 15 | | 15 | | | | | 20 | 0.5 | remainder |
| Y16 | 8 | 15 | | 15 | | | | | 20 | 0.5 | remainder |
| Y17 | 9 | 15 | | 15 | | | | | 20 | 0.5 | remainder |
| Y18 | 10 | 15 | | 15 | | | | | 20 | 0.5 | remainder |
| Y19 | 3 | 15 | | 9 | | | | | 20 | 0.5 | remainder |
| Y20 | 3 | 15 | | 25 | | | | | 20 | 0.5 | remainder |
| Y21 | 6 | 15 | | 15 | | | | | 20 | 0.5 | remainder |
| Y22 | 11 | 15 | | 15 | | | | | 20 | 0.5 | remainder |
| Y23 | 12 | 15 | | 15 | | | | | 20 | 0.5 | remainder |
| Y24 | 13 | 15 | | 15 | | | | | 20 | 0.5 | remainder |
| Y25 | 14 | 15 | | 15 | | | | | 20 | 0.5 | remainder |
| Y26 | 15 | 15 | | 15 | | | | | 20 | 0.5 | remainder |

TABLE 10

| | Black pigment dispersion | | Organic solvent | | | | | | Resin | | |
|---|---|---|---|---|---|---|---|---|---|---|---|
| | KB | amount | BuD | HexD | EDG | BDG | MB | BTG | microparticles | Activator | Water |
| K1 | 1 | 15 | 15 | | | | | | 20 | 0.5 | remainder |
| K2 | 2 | 15 | 15 | | | | | | 20 | 0.5 | remainder |
| K3 | 3 | 15 | 15 | | | | | | 20 | 0.5 | remainder |
| K4 | 7 | 15 | 15 | | | | | | 20 | 0.5 | remainder |
| K5 | 8 | 15 | 15 | | | | | | 20 | 0.5 | remainder |
| K6 | 3 | 15 | | 15 | | | | | 20 | 0.5 | remainder |
| K7 | 3 | 15 | | | 15 | | | | 20 | 0.5 | remainder |
| K8 | 3 | 15 | | | | 15 | | | 20 | 0.5 | remainder |
| K9 | 3 | 15 | | | | | 15 | | 20 | 0.5 | remainder |
| K10 | 3 | 15 | | | | | | 15 | 20 | 0.5 | remainder |
| K11 | 1 | 15 | | 15 | | | | | 20 | 0.5 | remainder |
| K12 | 2 | 15 | | 15 | | | | | 20 | 0.5 | remainder |
| K13 | 4 | 15 | | 15 | | | | | 20 | 0.5 | remainder |
| K14 | 5 | 15 | | 15 | | | | | 20 | 0.5 | remainder |
| K15 | 7 | 15 | | 15 | | | | | 20 | 0.5 | remainder |
| K16 | 8 | 15 | | 15 | | | | | 20 | 0.5 | remainder |
| K17 | 9 | 15 | | 15 | | | | | 20 | 0.5 | remainder |
| K18 | 10 | 15 | | 15 | | | | | 20 | 0.5 | remainder |
| K19 | 3 | 15 | | 9 | | | | | 20 | 0.5 | remainder |
| K20 | 3 | 15 | | 25 | | | | | 20 | 0.5 | remainder |
| K21 | 6 | 15 | | 15 | | | | | 20 | 0.5 | remainder |
| K22 | 11 | 15 | | 15 | | | | | 20 | 0.5 | remainder |
| K23 | 12 | 15 | | 15 | | | | | 20 | 0.5 | remainder |
| K24 | 13 | 15 | | 15 | | | | | 20 | 0.5 | remainder |
| K25 | 14 | 15 | | 15 | | | | | 20 | 0.5 | remainder |
| K26 | 15 | 15 | | 15 | | | | | 20 | 0.5 | remainder |

TABLE 11

| | White pigment dispersion | | Organic solvent | | | | | | Resin | | |
|---|---|---|---|---|---|---|---|---|---|---|---|
| | WB | amount | BuD | HexD | EDG | BDG | MB | BTG | microparticles | Activator | Water |
| W1 | 1 | 18 | 15 | | | | | | 20 | 0.5 | remainder |
| W2 | 2 | 18 | 15 | | | | | | 20 | 0.5 | remainder |
| W3 | 3 | 18 | 15 | | | | | | 20 | 0.5 | remainder |
| W4 | 7 | 18 | 15 | | | | | | 20 | 0.5 | remainder |
| W5 | 8 | 18 | 15 | | | | | | 20 | 0.5 | remainder |
| W6 | 8 | 18 | | 15 | | | | | 20 | 0.5 | remainder |
| W7 | 8 | 18 | | | 15 | | | | 20 | 0.5 | remainder |
| W8 | 8 | 18 | | | | 15 | | | 20 | 0.5 | remainder |
| W9 | 8 | 18 | | | | | 15 | | 20 | 0.5 | remainder |
| W10 | 8 | 18 | | | | | | 15 | 20 | 0.5 | remainder |
| W11 | 1 | 18 | | 15 | | | | | 20 | 0.5 | remainder |
| W12 | 2 | 18 | | 15 | | | | | 20 | 0.5 | remainder |
| W13 | 3 | 18 | | 15 | | | | | 20 | 0.5 | remainder |
| W14 | 4 | 18 | | 15 | | | | | 20 | 0.5 | remainder |
| W15 | 5 | 18 | | 15 | | | | | 20 | 0.5 | remainder |
| W16 | 7 | 18 | | 15 | | | | | 20 | 0.5 | remainder |
| W17 | 9 | 18 | | 15 | | | | | 20 | 0.5 | remainder |
| W18 | 10 | 18 | | 15 | | | | | 20 | 0.5 | remainder |
| W19 | 8 | 18 | | 9 | | | | | 20 | 0.5 | remainder |
| W20 | 8 | 18 | | 25 | | | | | 20 | 0.5 | remainder |
| W21 | 6 | 18 | | 15 | | | | | 20 | 0.5 | remainder |
| W22 | 11 | 18 | | 15 | | | | | 20 | 0.5 | remainder |
| W23 | 12 | 18 | | 15 | | | | | 20 | 0.5 | remainder |
| W24 | 13 | 18 | | 15 | | | | | 20 | 0.5 | remainder |
| W25 | 14 | 18 | | 15 | | | | | 20 | 0.5 | remainder |
| W26 | 16 | 18 | | 15 | | | | | 20 | 0.5 | remainder |

The abbreviations used in Tables 7, 8, 9, 10 and 11 are as follows.

BuD: 1,2-butanediol (boiling point: 191° C., surface tension: 31.6 mN/m)

HexD: 1,2-hexanediol (boiling point: 224° C., surface tension: 26.4 mN/m)

EDG: diethylene glycol monoethyl ether (boiling point: 196° C., surface tension: 31.1 mN/m)

BDG: diethylene glycol monobutyl ether (boiling point: 230° C., surface tension: 27.9 mN/m)

MB: methoxybutanol (boiling point: 158° C., surface tension: 29.3 mN/m)

BTG: triethylene glycol monobutyl ether (boiling point: 272° C., surface tension: 29.6 mN/m)

Resin microparticles: an acrylic emulsion (solid fraction: 40%, resin Tg: 80° C.)

Activator: TegoGlide 432 (a silicon-based activator, manufactured by Evonik Degussa GmbH)

Example 1

An ink set was formed using the prepared cyan ink 1 (C1), magenta ink 1 (M1), yellow ink 1 (Y1), black ink 1 (K1) and white ink 4 (W4), the ink set was loaded into an inkjet printer fitted with an inkjet head having piezo elements, and printing was conducted. The printing was conducted using a PET film as the printing substrate, and was performed with the printing substrate heated to 45° C. Printed items obtained using these inks and these printing conditions were subjected to the following evaluations. The results of the evaluations are shown in Table 12.

<Evaluation 1: Mixed Color Bleeding Between Color Ink and White Ink>

Using the printing substrate and the printing conditions described above, solid printing of the white ink was performed at a coverage rate of 100%, thereby subjecting the printing substrate to an undercoating treatment, and using various printing speeds, each of the color inks was then used to print 5 pt text onto the white undercoat, and the mixed color bleeding between the color inks and the white ink was evaluated visually. Using a similar method, solid printing of each of the color inks was performed at a coverage rate of 100%, thereby subjecting the printing substrate to an undercoating treatment, and using various printing speeds, the white ink was then used to print 5 pt text onto the color undercoat, and the mixed color bleeding between the color inks and the white ink was evaluated visually. The evaluation criteria are shown below, with an evaluation of AA, A or B being deemed favorable for practical application.

AA: mixed color bleeding between the color inks and the white ink is not observed at a printing speed of 10 m²/h A: mixed color bleeding between the color inks and the white ink is not observed at a printing speed of 8 m²/h B: mixed color bleeding between the color inks and the white ink is not observed at a printing speed of 6 m²/h C: mixed color bleeding between the color inks and the white ink is not observed at a printing speed of 4 m²/h D: mixed color bleeding between the color inks and the white ink is observed at a printing speed of 4 m²/h <Evaluation 2: Opacity Provided by Printed Ink Coating Film>

Using the printing substrate and the printing conditions described above, solid printing of the white ink was performed at a coverage rate of 100%, thereby subjecting the printing substrate to an undercoating treatment, solid printing of each of the color inks at a coverage rate of 100% was then performed on top of the white undercoat, and the opacity of the white ink coating film of the undercoat by the color ink coating film was evaluated both visually and using a magnifying lens. Using a similar method, solid printing of each of the color inks was performed at a coverage rate of 100%, thereby subjecting the printing substrate to an undercoating treatment, solid printing of the white ink at a coverage rate of 100% was then performed on top of the color undercoat, and the opacity of the color ink coating film of the undercoat by the white ink coating film was evaluated both visually and using a magnifying lens. The evaluation criteria are shown below, with an evaluation of AA, A or B being deemed favorable for practical application.

AA: the ink coating film of the undercoat is well covered and completely invisible, providing a sharp image A: the ink coating film of the undercoat is covered and not visible B: the ink coating film of the undercoat is covered and almost invisible C: coverage of the ink coating film of the undercoat is insufficient, and the undercoat is visible D: coverage of the ink coating film of the undercoat is insufficient, and the undercoat is clearly visible <Evaluation 3: Gloss of Printed Ink Coating Film>

A printed item printed under the printing conditions described for Evaluation 1 was dried for 2 hours at room temperature, and the degree of gloss of the printed item was then evaluated visually and by measuring the gloss using a 60° gloss meter. The evaluation criteria are shown below, with an evaluation of AA, A or B being deemed favorable for practical application.

AA: the gloss value is extremely high, and the uniformity of the gloss of the printed surface is excellent A: the gloss value is high, and the uniformity of the gloss of the printed surface is good B: the gloss value is high, but the gloss of the printed surface is slightly lacking in uniformity C: the uniformity of the gloss of the printed surface is poor, and the gloss value is also low D: the uniformity of the gloss of the printed surface is very poor, and the gloss value is also low <Evaluation 4: Discharge Properties 1>

Solid printing was performed with a print width of 1 m using the printing substrate and the printing conditions described above, and after every 1 m of print length, a nozzle check pattern was printed for both the color inks and the white ink, the number of blocked nozzles was counted, and an evaluation was made on the basis of that count. An evaluation of AA, A or B is deemed favorable for practical application.

AA: no blocked nozzles after a print length of 5 m

A: no blocked nozzles after a print length of 2 m

B: no blocked nozzles after a print length of 1 m

C: 1 to 10 blocked nozzles after a print length of 1 m

<Evaluation 5: Discharge Properties 2>

Following printing under the conditions described for Evaluation 4, the printer was left to stand for 6 hours at 25° C. with the inks still loaded in the printer, and printing was then conducted again under the same conditions as Evaluation 4. A nozzle check pattern was printed for both the color inks and the white ink after every 1 m of print length, the number of blocked nozzles was counted, and an evaluation was made on the basis of that count. An evaluation of AA, A or B is deemed favorable for practical application.

AA: no blocked nozzles after a print length of 5 m

A: no blocked nozzles after a print length of 2 to 4 m

B: no blocked nozzles after a print length of 1 m

C: 1 to 10 blocked nozzles after a print length of 1 m

Examples 2 to 34, Comparative Examples 1 to 6

Color inks and white inks were combined as shown in Table 12 to form ink sets, and these ink sets were then evaluated in a similar manner to Example 1.

TABLE 12

| | Ink combination | | | | Pigment dispersing resin | | | | | Evaluation 1 Mixed color bleeding | Evaluation 2 Opacity | Evaluation 3 Gloss | Evaluation 4 Discharge properties 1 | Evaluation 5 Discharge properties 2 |
|---|---|---|---|---|---|---|---|---|---|---|---|---|---|---|
| | Color inks | | | | White ink | Color inks | | | | White ink | | | | | |
| | C | M | Y | K | W | C | M | Y | K | W | | | | | |
| Example 1 | C1 | M1 | Y1 | K1 | W4 | 1 | 1 | 1 | 1 | 7 | A | B | B | A | B |
| Example 2 | C2 | M2 | Y2 | K2 | W4 | 2 | 2 | 2 | 2 | 7 | A | B | A | A | B |
| Example 3 | C3 | M3 | Y3 | K3 | W5 | 3 | 3 | 3 | 3 | 8 | A | B | A | AA | A |
| Example 4 | C4 | M4 | Y4 | K4 | W1 | 7 | 7 | 7 | 7 | 1 | B | B | B | A | B |
| Example 5 | C4 | M4 | Y4 | K4 | W2 | 7 | 7 | 7 | 7 | 2 | B | B | A | A | B |
| Example 6 | C5 | M5 | Y5 | K5 | W3 | 8 | 8 | 8 | 8 | 3 | B | B | A | A | A |
| Example 7 | C6 | M6 | Y6 | K6 | W6 | 3 | 3 | 3 | 3 | 8 | AA | AA | AA | AA | A |
| Example 8 | C7 | M7 | Y7 | K7 | W7 | 3 | 3 | 3 | 3 | 8 | A | B | A | AA | A |
| Example 9 | C8 | M8 | Y8 | K8 | W8 | 3 | 3 | 3 | 3 | 8 | AA | AA | AA | AA | A |
| Example 10 | C9 | M9 | Y9 | K9 | W9 | 3 | 3 | 3 | 3 | 8 | AA | A | A | B | B |
| Example 11 | C10 | M10 | Y10 | K10 | W10 | 3 | 3 | 3 | 3 | 8 | A | AA | AA | AA | A |
| Example 12 | C11 | M11 | Y11 | K11 | W16 | 1 | 1 | 1 | 1 | 7 | AA | A | A | A | B |
| Example 13 | C12 | M12 | Y12 | K12 | W16 | 2 | 2 | 2 | 2 | 7 | AA | AA | AA | A | B |
| Example 14 | C13 | M13 | Y13 | K13 | W6 | 4 | 4 | 4 | 4 | 8 | AA | A | A | AA | A |
| Example 15 | C14 | M14 | Y14 | K14 | W6 | 5 | 5 | 5 | 5 | 8 | AA | AA | AA | AA | AA |
| Example 16 | C6 | M6 | Y6 | K6 | W17 | 3 | 3 | 3 | 3 | 9 | AA | AA | AA | AA | A |
| Example 17 | C6 | M6 | Y6 | K6 | W18 | 3 | 3 | 3 | 3 | 10 | AA | A | A | AA | A |
| Example 18 | C15 | M15 | Y15 | K15 | W11 | 7 | 7 | 7 | 7 | 1 | A | A | A | B | B |
| Example 19 | C15 | M15 | Y15 | K15 | W12 | 7 | 7 | 7 | 7 | 2 | A | A | AA | B | B |
| Example 20 | C16 | M16 | Y16 | K16 | W13 | 8 | 8 | 8 | 8 | 3 | A | A | AA | A | B |
| Example 21 | C16 | M16 | Y16 | K16 | W14 | 8 | 8 | 8 | 8 | 4 | A | A | A | A | B |
| Example 22 | C16 | M16 | Y16 | K16 | W15 | 8 | 8 | 8 | 8 | 5 | A | A | AA | A | B |
| Example 23 | C17 | M17 | Y17 | K17 | W13 | 9 | 9 | 9 | 9 | 3 | A | A | AA | B | B |
| Example 24 | C18 | M18 | Y18 | K18 | W13 | 10 | 10 | 10 | 10 | 3 | A | A | A | A | B |
| Example 25 | C19 | M19 | Y19 | K19 | W19 | 3 | 3 | 3 | 3 | 8 | AA | A | AA | AA | A |
| Example 26 | C20 | M20 | Y20 | K20 | W20 | 3 | 3 | 3 | 3 | 8 | A | AA | AA | AA | A |
| Example 27 | C24 | M24 | Y24 | K24 | W25 | 13 | 13 | 13 | 13 | 14 | AA | AA | AA | AA | AA |
| Example 28 | C25 | M25 | Y25 | K25 | W24 | 14 | 14 | 14 | 14 | 13 | A | A | AA | B | B |
| Example 29 | C22 | M22 | Y22 | K22 | W23 | 11 | 11 | 11 | 11 | 12 | B | B | A | AA | AA |
| Example 30 | C22 | M22 | Y22 | K22 | W14 | 11 | 11 | 11 | 11 | 4 | B | A | A | AA | AA |
| Example 31 | C22 | M22 | Y22 | K22 | W8 | 11 | 11 | 11 | 11 | 8 | A | A | A | AA | AA |
| Example 32 | C6 | M6 | Y6 | K6 | W23 | 3 | 3 | 3 | 3 | 12 | A | A | A | AA | AA |
| Example 33 | C26 | M26 | Y26 | K26 | W6 | 15 | 15 | 15 | 15 | 8 | AA | AA | AA | AA | A |
| Example 34 | C6 | M6 | Y6 | K6 | W26 | 3 | 3 | 3 | 3 | 16 | AA | AA | AA | AA | A |
| Comparative Example 1 | C6 | M6 | Y6 | K6 | W13 | 3 | 3 | 3 | 3 | 3 | C | C | C | AA | A |
| Comparative Example 2 | C16 | M16 | Y16 | K16 | W6 | 8 | 8 | 8 | 8 | 8 | D | D | D | A | B |
| Comparative Example 3 | C21 | M21 | Y21 | K21 | W6 | 6 | 6 | 6 | 6 | 8 | C | C | D | B | B |
| Comparative Example 4 | C16 | M16 | Y16 | K16 | W21 | 8 | 8 | 8 | 8 | 6 | D | D | D | B | B |
| Comparative Example 5 | C22 | M22 | Y22 | K22 | W22 | 11 | 11 | 11 | 11 | 11 | C | C | C | A | A |
| Comparative Example 6 | C23 | M23 | Y23 | K23 | W23 | 12 | 12 | 12 | 12 | 12 | C | C | C | A | A |

Examples 1 to 34 are examples of either sets of color inks that use a pigment dispersing resin having an alkyl chain with a carbon number of 10 or greater and a white ink that uses a pigment dispersing resin having a polyoxyalkylene chain, or sets of a white ink that uses a pigment dispersing resin having an alkyl chain with a carbon number of 10 or greater and color inks that use a pigment dispersing resin having a polyoxyalkylene chain, and these examples exhibited favorable results for all of the evaluations. In contrast, the ink sets having the compositions of Comparative Examples 1 to 4 each exhibited inferior results for mixed color bleeding, opacity and gloss. Further, Comparative Examples 5 and 6 represent examples in which the same pigment dispersing resin was used for the color inks and the white ink, and the results for mixed color bleeding and gloss were inferior to those of the Examples.

Accordingly, it was clear that the embodiments of the present invention exhibited excellent printability during high-speed printing to less permeable substrates, and yielded sharp image quality with little mixed color bleeding.

The present invention is related to the subject matter disclosed in prior Japanese Application No. 2015-031193, the entire contents of which are incorporated by reference herein.

The invention claimed is:

1. An ink set for inkjet recording comprising a white ink and color inks including a cyan ink, a magenta ink and a yellow ink, wherein
   each ink independently comprises a pigment, a pigment dispersing resin, an organic solvent and water,
   the pigment dispersing resin of each color ink is, independently, a pigment dispersing resin A having an alkyl chain with a carbon number of 10 or greater,
   the pigment dispersing resin of the white ink is a pigment dispersing resin B having a polyoxyethylene chain,
   a proportion of a monomer unit having the alkyl chain with the carbon number of 10 or greater is at least 10% by weight but not more than 90% by weight among all monomer units that constitute the pigment dispersing resin A, a proportion of a monomer unit having the polyoxyethylene chain is at least 10% by weight but not more than 75% by weight among all monomer units that constitute the pigment dispersing resin B, and the pigment dispersing resin A and the pigment dispersing resin B are different resins.

2. An ink set for inkjet recording comprising a white ink and color inks including a cyan ink, a magenta ink and a yellow ink, wherein each ink independently comprises a pigment, a pigment dispersing resin, an organic solvent and water, the pigment dispersing resin of each color ink is, independently, a pigment dispersing resin B having a polyoxyethylene chain, the pigment dispersing resin of the white ink is a pigment dispersing resin A having an alkyl chain with a carbon number of 10 or greater, a proportion of a monomer unit having the alkyl chain with the carbon number of 10 or greater is at least 10% by weight but not more than 90% by weight among all monomer units that constitute the pigment dispersing resin A, a proportion of a monomer unit having the polyoxyethylene chain is at least 10% by weight but not more than 75% by weight among all monomer units that constitute the pigment dispersing resin B, and the pigment dispersing resin A and the pigment dispersing resin B are different resins.

3. An ink set for inkjet recording comprising a white ink and color inks including a cyan ink, a magenta ink and a yellow ink, wherein each ink independently comprises a pigment, a pigment dispersing resin, an organic solvent and water, the pigment dispersing resin of either the white ink or the color inks is a pigment dispersing resin A having an alkyl chain with a carbon number of 10 or greater, the pigment dispersing resin of the other of the white ink or the color inks is a pigment dispersing resin B having a polyoxyethylene chain, a proportion of a monomer unit having the alkyl chain with the carbon number of 10 or greater is at least 10% by weight but not more than 90% by weight among all monomer units that constitute the pigment dispersing resin A, a proportion of a monomer unit having the polyoxyethylene chain is at least 10% by weight but not more than 75% by weight among all monomer units that constitute the pigment dispersing resin B, and the pigment dispersing resin A and the pigment dispersing resin B are different resins.

4. The ink set for inkjet recording according to claim 1, comprising an organic solvent having a boiling point of at least 180° C. but not more than 280° C. and a surface tension of at least 20 mN/m but not more than 30 mN/m at 25° C. as the organic solvent.

5. The ink set for inkjet recording according to claim 1, wherein an acid value of the pigment dispersing resin A is higher than an acid value of the pigment dispersing resin B.

6. The ink set for inkjet recording according to claim 1, wherein at least one of the pigment dispersing resin A and the pigment dispersing resin B independently has an aromatic ring structure.

7. An inkjet printing method that uses the ink set for inkjet recording according to claim 1, the method comprising:

a step of subjecting a printing substrate to an undercoating treatment by printing one of either a color ink or the white ink onto the printing substrate, while heating the printing substrate at 40 to 80° C., and a step of printing the other of the color ink or the white ink onto the printing substrate that has undergone the undercoating treatment, while heating the printing substrate at 40 to 80° C.

8. The ink set for inkjet recording according to claim 2, comprising an organic solvent having a boiling point of at least 180° C. but not more than 280° C. and a surface tension of at least 20 mN/m but not more than 30 mN/m at 25° C. as the organic solvent.

9. The ink set for inkjet recording according to claim 2, wherein an acid value of the pigment dispersing resin A is higher than an acid value of the pigment dispersing resin B.

10. The ink set for inkjet recording according to claim 2, wherein at least one of the pigment dispersing resin A and the pigment dispersing resin B independently has an aromatic ring structure.

11. An inkjet printing method that uses the ink set for inkjet recording according to claim 2, the method comprising:

a step of subjecting a printing substrate to an undercoating treatment by printing one of either a color ink or the white ink onto the printing substrate, while heating the printing substrate at 40 to 80° C., and a step of printing the other of the color ink or the white ink onto the printing substrate that has undergone the undercoating treatment, while heating the printing substrate at 40 to 80° C.

12. The ink set for inkjet recording according to claim 3, comprising an organic solvent having a boiling point of at least 180° C. but not more than 280° C. and a surface tension of at least 20 mN/m but not more than 30 mN/m at 25° C. as the organic solvent.

13. The ink set for inkjet recording according to claim 3, wherein an acid value of the pigment dispersing resin A is higher than an acid value of the pigment dispersing resin B.

14. The ink set for inkjet recording according to claim 3, wherein at least one of the pigment dispersing resin A and the pigment dispersing resin B independently has an aromatic ring structure.

15. An inkjet printing method that uses the ink set for inkjet recording according to claim 3, the method comprising:

a step of subjecting a printing substrate to an undercoating treatment by printing one of either a color ink or the white ink onto the printing substrate, while heating the printing substrate at 40 to 80° C., and a step of printing the other of the color ink or the white ink onto the printing substrate that has undergone the undercoating treatment, while heating the printing substrate at 40 to 80° C.

* * * * *